July 14, 1970  J. MORAN ET AL  3,520,442
PROTECTIVE SHIELD FOR FRANGIBLE METER ENCLOSURE
Filed July 18, 1968

INVENTORS
JACK MORAN
BOYD STEVESON
WILLIAM A. REYNOLDS
BY
Browne, Schuyler + Beveridge
ATTORNEYS

United States Patent Office 3,520,442
Patented July 14, 1970

3,520,442
PROTECTIVE SHIELD FOR FRANGIBLE METER ENCLOSURE
Jack Moran and Boyd Steveson, Fort Gibson, and William A. Reynolds, Oklahoma City, Okla., assignors to M-R-S, Inc., Fort Gibson, Okla., a corporation of Oklahoma
Filed July 18, 1968, Ser. No. 745,915
Int. Cl. B65d 25/54
U.S. Cl. 220—82        12 Claims

ABSTRACT OF THE DISCLOSURE

A cup shaped shield of impact resistant material is provided with a notched flange at its base to permit its insertion into the opening of a meter housing.

BACKGROUND OF THE INVENTION

Conventional meters such as electric watthour meters have frangible glass globes which serve as enclosures for the meter dials and a portion of the meter mechanism. The glass enclosures project from a housing and are exposed so that they may be broken either intentionally or accidentally.

According to the present invention, a protective shield of impact resistant material is supported on the front panel of the meter housing to enclose the frangible glass enclosure. Preferably the shield is provided with a particular type of flange at its base which permits its insertion into the opening in a standard meter housing.

SUMMARY

The protective shield of this invention is made of an impact resistant material and has a base which is adapted to be supported on the opening in a front panel of a meter housing. Preferably, a flange at the base of the shield has a generally circular periphery which is notched so that it may first be partially inserted in a canted fashion through the opening in the meter housing and then manipulated until it is entirely passed through the front panel of the meter housing.

One object of this invention is to provide a shield which adequately protects glass globes of meters. Another is to provide a simple and convenient manner of attaching the shield to a conventional meter housing.

DESCRIPTION OF THE DRAWINGS

The drawings are illustrative of only a preferred embodiment of the invention which may assume various other forms without departing from the spirit of the invention.

DESCRIPTION OF THE PREFERRED EMBODIMENT

Figure 1:
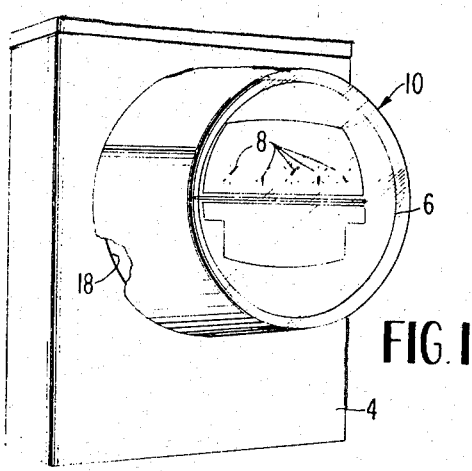
FIG. 1 is a perspective view of a conventional meter, showing the usual meter housing and a projecting frangible meter enclosure.

A conventional electric watthour meter is shown in FIG. 1 and includes a rectangular box-like housing made of sheet steel or other suitable rigid material. The front panel 4 of the housing is pivotally attached along one vertical edge of the housing. The panel 4 has a circular opening 18 which permits the transparent glass globe enclosure 6 to project therethrough, thus permitting an observer to inspect the dials 8 of the meter.

The frangible nature of the globe 6 renders it vulnerable to vandalism and to accidental breakage when located in high traffic areas of industrial facilities. In order to avert such damage, this invention proposes to enclose the globe 6 within a cup-shaped shield 10 which is attached in a particular manner to the front panel 4 of the housing.

Figure 2:
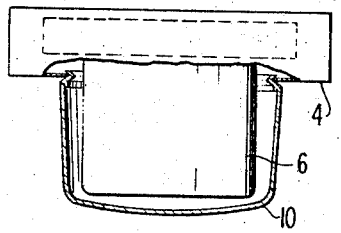
FIG. 2 is a sectional view taken in a horizontal plane through the assembly of the type shown in FIG. 1 which is provided with the shield of this invention.

In FIG. 2, it will be seen that the globe 6 has its normally exposed portion surrounded by the shield 10. The shield is generally cup shaped and is formed of an impact resistant transparent material, preferably an organic polymer such as ultraviolet stabilized polycarbonate. Additional strength is provided by the axially extending reinforcing ribs 17 which are integrally formed with the shield. The shield has a base with a radially projecting flange 12 which is adapted to lie behind the front panel of the meter housing. Another annular flange 14 operates as a retainer means and is located where it will lie proximate to the outer face of the front panel 4 in order to prevent the shield from being forced inwardly. A major portion of the shield also acts as a retainer since its dimensions are greater than the corresponding dimensions of the opening 18 in the front panel 4.

Figure 3:
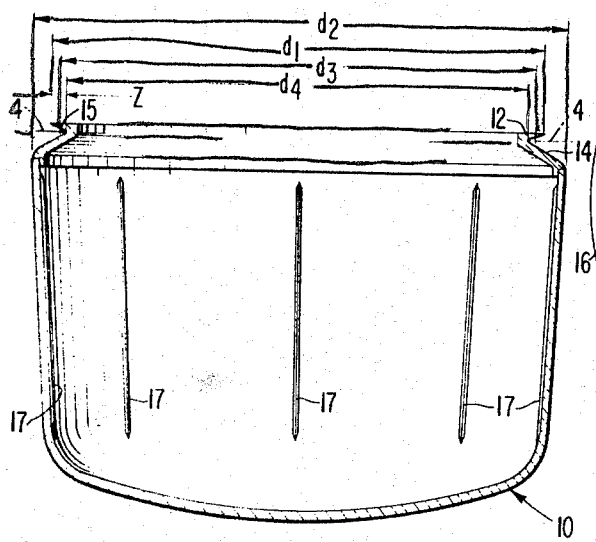
FIG. 3 is a sectional view taken through the longitudinal centerline of the impact resistant shield.

FIG. 3 shows details of the shield, with a corresponding location of the front panel being illustrated in broken lines at 4. Of course, the outside diameter $d_1$ of the flange 12 and the outside diameter $d_2$ of the retainer flange 14 are greater than the corresponding diameter $d_3$ of the opening 18 in the front panel 4. The reduced diameter portion 15 of the shield between the flanges 12 and 14 has an outside diameter $d_4$ which is less than the diameter $d_3$ of the opening 18. The distance Z which is the radial distance between the periphery of the flange 12 and the portion 15 is at least as great as the difference between the dimensions $d_1$ and $d_3$ in order to permit the shield to be applied to the front panel in the manner described below.

Figure 4:
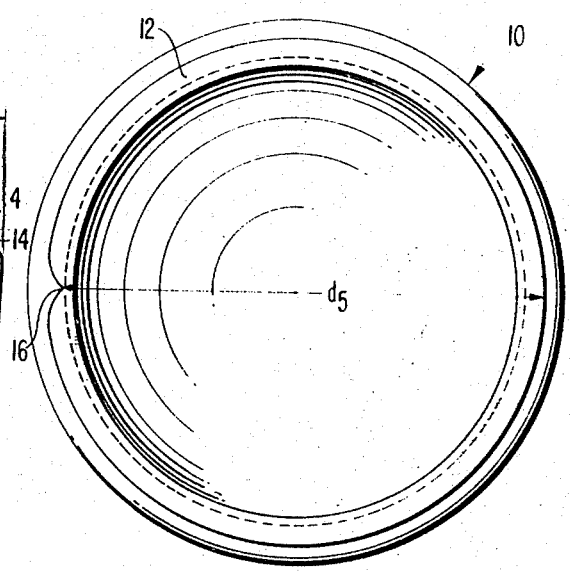
FIG. 4 is a rear view of the shield of this invention.

Insertion of the flange 12 to a position behind the front panel for the meter enclosure is possible due to the presence of a peripheral notch 16 which is shown in the rear view of the shield in FIG. 4. The diameter $d_5$ of the flange 14 across the notched portion is no greater than the diameter $d_3$ of the opening 18.

Figure 5:
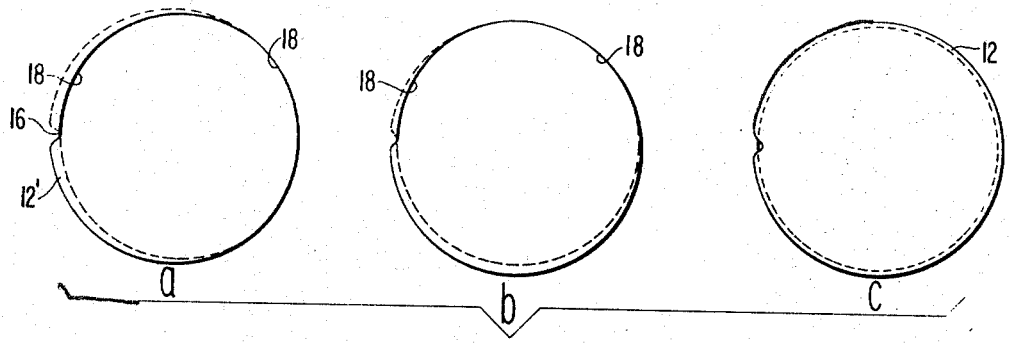
FIG. 5 illustrates the sequence of events when placing the shield on a housing, as seen from the rear side of the front panel of the housing.

The manner of placing the shield on a meter housing will be understood from FIG. 5 which includes three views taken from the rear of the front panel 4. In the first view, the notch 16 has been placed against the edge of the opening in the front panel so that a portion 12' of the flange 12 lies behind the meter panel. The periphery of the flange 12 is then advanced progressively through the opening 18 in the meter panel through the stages illustrated first in FIG. 5b into its final position shown in FIG. 5c.

Under normal gravitational influences, the shield will assume a somewhat lower position than that shown in FIG. 5c, since the shield has internal dimensions which are greater than the etxernal dimensions of the enclosure 6; and, the groove in the shield which receives the front panel 4 of the meter housing must have an outside diameter which is less than the diameter of the opening 18. However, the orientation shown in FIG. 5c is possible when there is a relatively close fit between the globe 6 of the meter enclosure and the main body of the shield 10. When this is the case, the shield 10 will be attached to the front panel 4 while the front panel 4 is pivoted away on the usual hinges from the globe 6. Then upon closing the front panel 4 to its usual position shown in FIG. 1, the shield will be elevated slightly and maintained in the position shown in FIG. 5c. This arrangement is also desirable from the standpoint that it prevents unauthorized removal of the shield when the front panel 4 is locked in position on the meter housing.

The foregoing description has been directed only to a preferred form of the invention, utilizing a notched flange which permits attachment of a protective shield from the exterior surface of the front panel of a meter housing. It is to be understood, however, that the invention may assume various other forms and shapes, both of the shield and the attaching flange, falling within the spirit of this invention and the scope of the claims which follow.

We claim:

1. A protective shield for a meter of the type having a frangible meter enclosure projecting outwardly through a circular opening in a thin front panel, said shield being made of impact resistant material and having a flange with a generally circular periphery at its base adapted to lie immediately behind the front panel, retainer means on the shield axially spaced a short distance from the flange adapted to lie proximate to the outer face of the front panel whereby the shield is retained on the front panel between the flange and the retainer, said flange having a peripheral notch which permits its insertion in a canted fashion through the opening whereby the periphery of the flange may progressively be passed through the front panel to attach the shield thereto.

2. A shield according to claim 1 wherein the retainer means is a second annular flange which lies parallel to the aforementioned flange.

3. A shield according to claim 1 wherein the outside diameter of the flange at the location of the notch is no greater than the diameter of the circular opening.

4. A shield acocrding to claim 1 in combination with a meter having said front panel and said frangible meter enclosure, said flange having a diameter throughout its major portion which is greater than the diameter of the circular opening and a diameter at the location of the notch which is no greater than the diameter of the circular opening.

5. The invention according to claim 4 wherein the portion of the shield which lies within the circular opening has a diameter no greater than that of the circular opening.

6. The invention according to claim 4 wherein the shield is cup shaped and has internal dimensions greater than the corresponding external dimensions of the frangible meter enclosure.

7. The invention according to claim 6 wherein the shield is transparent and has axially extending reinforcing ribs.

8. The invention according to claim 6 wherein the outside diameter of the flange is less than the diameter of a major portion of the cup shaped shield.

9. The invention according to claim 4 wherein said periphery of the flange lies radialy beyond the outside diameter of that portion of the shield between the flange and the retainer means by a distance which is at least as great as the difference between said outside diameter of the flange and the diameter of the circular opening.

10. The invention according to claim 9 having only one said peripheral notch.

11. An electrical meter assembly comprising a housing with a front panel having an opening, a frangible meter enclosure projecting from within the housing outwardly through the opening without contacting the front panel, and a shield supported on the front panel and surrounding the portion of the frangible meter enclosure which lies outside the housing, said shield having a flange at its base with dimensions greater than corresponding dimensions of the opening through which it projects; whereby the flange retains the shield on the front panel by preventing movement of the shield outwardly from the front panel.

12. An electrical meter assembly according to claim 11 wherein the opening and the flange are generally circular, said flange having a notch in its periphery to provide a portion of the flange having a diametrical measurement no greater than that of the opening, a portion of said shield lying outside the housing having outside diametrical measurements greater than the diameter of the opening thereby preventing excessive displacement of the shield inwardly through the opening.

References Cited

UNITED STATES PATENTS

| 2,773,388 | 12/1956 | Prosser | 73—431 |
| 3,152,480 | 10/1964 | Hoff | 73—431 |

FOREIGN PATENTS

| 218,103 | 10/1958 | Australia. |
| 648,966 | 9/1962 | Canada. |

GEORGE E. LOWRANCE, Primary Examiner

U.S. Cl. X.R.

73—431